(12) United States Patent
Gross et al.

(10) Patent No.: US 11,858,075 B1
(45) Date of Patent: Jan. 2, 2024

(54) HEAT PIPE WICK BONDING THROUGH CRIMPING

(71) Applicant: Westinghouse Electric Company LLC, Cranberry Township, PA (US)

(72) Inventors: David M. Gross, Gibsonia, PA (US); Adana L. Stanish, Cranberry Township, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 18/049,526

(22) Filed: Oct. 25, 2022

(51) Int. Cl.
*B23P 15/26* (2006.01)

(52) U.S. Cl.
CPC ............ *B23P 15/26* (2013.01); *B23P 2700/09* (2013.01)

(58) Field of Classification Search
CPC ............. F28F 2255/00; F28F 2275/061; F28F 2275/10; F28F 2275/122; B23P 15/26; B23P 2700/09
See application file for complete search history.

*Primary Examiner* — Lee A Holly
(74) *Attorney, Agent, or Firm* — K&L Gates LLP

(57) ABSTRACT

A method of forming a wick assembly is disclosed including positioning an inner ring in a first wick, positioning the inner ring in a second wick, abutting an end of the first wick with an end of the second wick, positioning an outer ring about a portion of the first wick and a portion of the second wick, positioning a mandrel within the inner ring, positioning a die about the outer ring, and applying a force to the die, wherein the force couples the outer ring, the inner ring, the first wick, and the second wick together to form the wick assembly.

20 Claims, 5 Drawing Sheets

HEAT PIPE WICK BONDING THROUGH CRIMPING

GOVERNMENT CONTRACT

This invention was made with government support under Contract DE-NE0008853 awarded by the Department of Energy. The government has certain rights in the invention.

BACKGROUND

This invention relates generally to heat pipes used in heat transfer systems, and more particularly, to wicks within the heat pipes that are configured to transfer the working fluid of the heat pipe from a condenser region of the heat pipe to an evaporator region.

BRIEF DESCRIPTION OF THE DRAWINGS

Various features of the embodiments described herein, together with advantages thereof, may be understood in accordance with the following description taken in conjunction with the accompanying drawings as follows.

Corresponding reference characters indicate corresponding parts throughout the several views. The exemplifications set out herein illustrate various embodiments of the invention, in one form, and such exemplifications are not to be construed as limiting the scope of the invention in any manner.

DETAILED DESCRIPTION

Numerous specific details are set forth to provide a thorough understanding of the overall structure, function, manufacture, and use of the embodiments as described in the specification and illustrated in the accompanying drawings. Well-known operations, components, and elements have not been described in detail so as not to obscure the embodiments described in the specification. The reader will understand that the embodiments described and illustrated herein are non-limiting examples, and thus it can be appreciated that the specific structural and functional details disclosed herein may be representative and illustrative. Variations and changes thereto may be made without departing from the scope of the claims.

Figure 1:
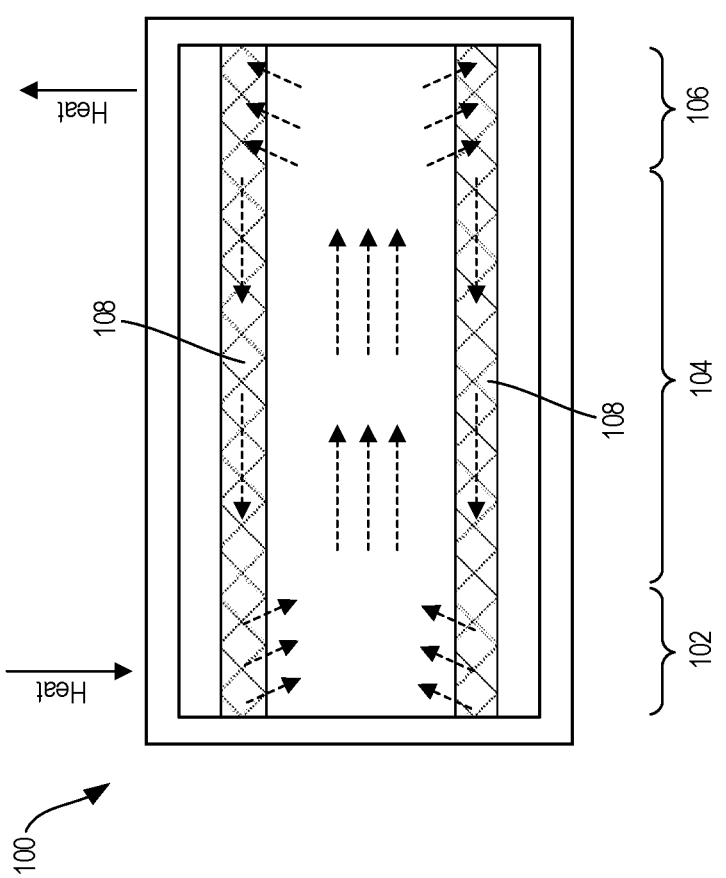
FIG. 1 illustrates working fluid moving through a heat pipe.

A heat pipe is a hermetically sealed, two-phase heat transfer component used to transfer heat from a primary side (evaporator section) to a secondary side (condenser section). FIG. 1, as an example, illustrates a heat pipe 100 comprising the aforementioned evaporator section 102 and condenser section 106, along with an adiabatic section 104 extending therebetween. The heat pipe 100 further includes a working fluid (such as water, liquid potassium, sodium, or alkali metal) and a wick 108. In operation, the working fluid is configured to absorb heat in the evaporator section 102 and vaporize. The saturated vapor, carrying latent heat of vaporization, flows towards the condenser section 106 through the adiabatic section 104. In the condenser section 106, the vapor condenses into a liquid pool 110 and gives off its latent heat. The condensed liquid is then returned to the evaporator section 102 through the wick 108 by capillary action. The aforementioned flow path of the working fluid is illustrated by segmented arrows in FIG. 1. The phase change processes and two-phase flow circulation continues as long as the temperature gradient between the evaporator and condenser sections is maintained. Due to the very high heat transfer coefficients for boiling and condensation, heat pipes are highly effective thermal conductors.

In nuclear systems, heat pipes are utilized by placing the evaporator section of the heat pipe within the reactor core containing nuclear fuel and the condenser section is placed near heat exchangers. The nuclear fuel vaporizes the working fluid and heat exchangers absorb the latent heat at the condenser section. Example heat pipes in nuclear applications are described in U.S. Pat. Nos. 5,684,848, 6,768,781, and U.S. Patent Application Publication No. 2016/0027536, all of which are hereby incorporated by reference herein in their entireties.

Another example use for heat pipes in nuclear systems is with micro-reactors, which are nuclear reactors that generate less than 10 MWe and are capable of being deployed for remote applications. These micro-reactors can be packaged in relatively small containers, operate without active involvement of personnel, and operate without refueling/replacement for a longer period than conventional nuclear power plants. One such micro-reactor is the eVinci Micro Reactor system, designed by Westinghouse Electric Company. The eVinci system is a heat pipe cooled reactor power system that utilizes heat pipes to act as passive heat removal devices that efficiently move thermal energy out of the reactor core to heat exchangers.

The heat pipes used in the micro-reactors experience extreme operating temperatures (>850° C.) and requires an internal wick that is made from materials that can withstand these temperatures and are compatible with the working fluid. This wick can be constructed from a wire mesh that is rolled and diffusion bonded together into a tube-like structure. The wick tube allows for the working fluid within the heat pipe to pass through it radially (such as after the latent heat is given off and the working fluid is absorbed by the wick) and along its axis (transferring the working fluid back toward the evaporator section with capillary action) while remaining rigid.

Manufacturing a wick for insertion into a heat pipe requires a highly complex and detailed process. At a very high level, a wick is manufactured from a piece of wire mesh that is wrapped around a mandrel made from a metal tube and expandable bladder. A hydroforming device is used to mechanically deform and bond the wick together into the desired shape prior to diffusion bonding. Example hydroforming devices are described in U.S. Patent Application Publication Ser. No. 16/853,270 and U.S. Provisional Patent Application No. 63/012,725, which are hereby incorporated by reference in their entireties herein. Once bonded, the wick is diffusion bonded together in an oven at vacuum levels while maintaining the wick in a compressed state, and then removing materials used to hold the wick in the compressed state during diffusion bonding. An example method for wick forming is described in U.S. Pat. No. 3,964,902, which is hereby incorporated by reference in its entirety herein. Currently a method is used to place ends on either side of the wick using a crimp and die process, described in U.S. Provisional Patent Application No. 62/979,822, which is hereby incorporated by reference in its entirety herein.

In operation, making 48" wicks has become a standard practice which can be done with existing equipment. However, moving a 48" rolled wick into the hydroformer requires multiple people and does not lend itself to full production length of ~22'.

In view of the foregoing, it would desirable to form full production length wicks, such as 22' wicks, from wicks made by standard practices (i.e., 48" wicks), such as by joining wicks axially end to end. This would allow for manufacturing of short wicks and then joining them in a mechanical fashion to create a production length wick. This operation would eliminate the complexities that arise in making 22' long wicks.

Currently a lab grade clean space is required that is longer than the wick. An ultrasonic cleaning trough is required that can hold the wick material prior to forming. For a 48" wick, the metal mesh is rolled along its short length and placed into the current cleaner. For a 22' long wick, however, this proves to be difficult to roll in the short axis due to the material being 5.5 times longer. Therefore, the tighter rolled mesh may not be properly cleaned leading to detrimental or failed heat pipe performance.

A system and process that connects shorter wicks would allow for production of any length required utilizing the simplicity of shorter wick manufacturing. Currently short wicks can be rolled and hydroformed quickly (under 2 hours). Therefore, multiple short wicks can be manufactured, tested, and quality tested to make the full length wick.

In joining two wicks, the seam therebetween must be able to pass a bubble test. The bubble test is an indication of wick performance. Pressure is slowly applied within the wick using inert gas while submerged in deionized water. The higher the pressure that the wick can hold, the better the performance within the heat pipe. This seam must be as pressure resistant as the rest of the wick. Accordingly, the manner in wick the wicks are joined must be low profile such that they do not constrict the flow during operation—gas in the center of the wick and liquid between the outer surface of the wick and the inner surface of the heat pipe tube.

Figure 2:
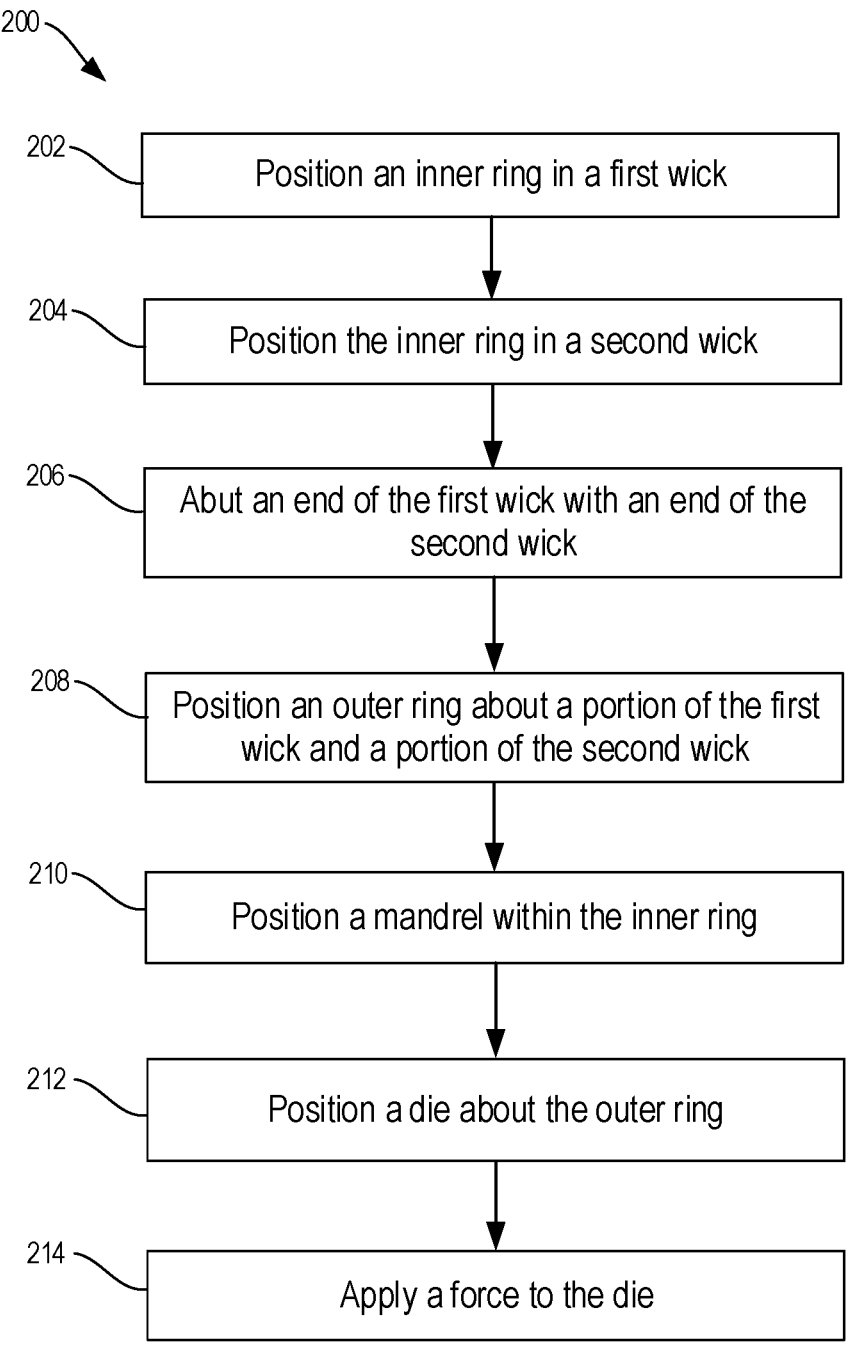
FIG. 2 illustrates a method for forming a wick assembly, according to at least one aspect of the present disclosure.
Figure 3:
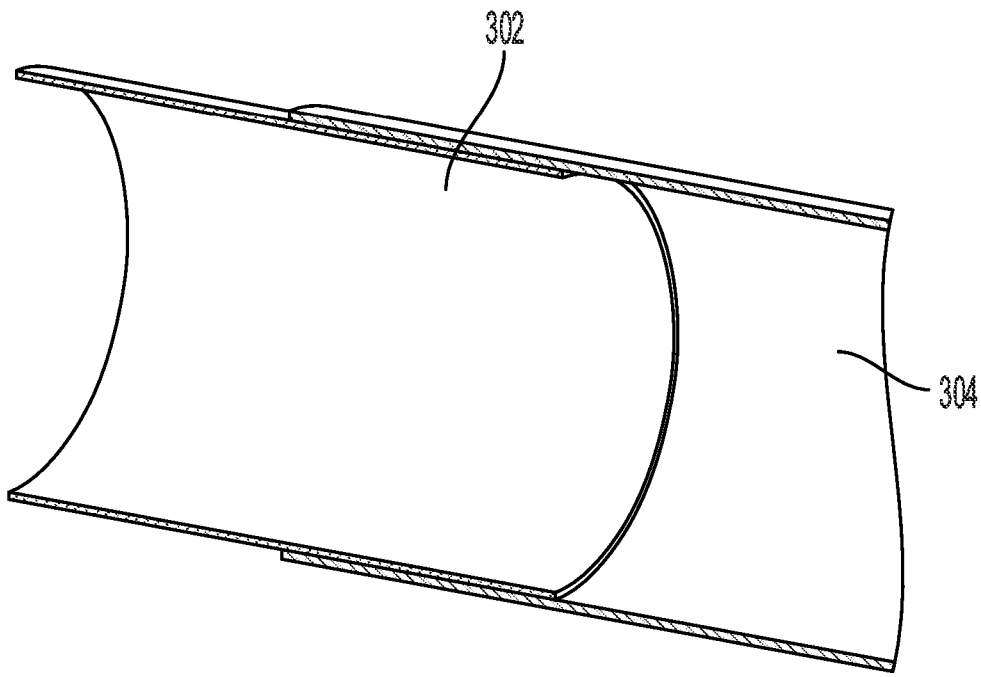
FIG. 3 illustrates an inner ring positioned within a first wick, according to at least one aspect of the present disclosure.

Referring now to FIG. 2, a method 200 for forming a wick assembly is provided, according to at least one aspect of the present disclosure. In various embodiments, the method 200 comprises positioning 202 an inner ring in a first wick. In one aspect, referring to FIG. 3, an inner ring 302 and a first wick 304 are provided. The inner ring 302 defines an outer diameter and the first wick 304 defines an inner diameter. In some embodiments, the inner diameter of the first wick 304 is substantially the same as the outer diameter of the inner ring 302. Accordingly, insertion of the inner ring 302 within the first wick 304 results in a tight friction fit therebetween. In various other embodiments, the outer diameter of the inner ring 302 can be less than the inner diameter of the first wick 304 to allow the inner ring 302 to easily move within the first wick 304. In various embodiments, the first wick 304 and the inner ring 302 can be made of similar materials. In various other embodiments, the first wick 304 and the inner ring 302 can be made of dissimilar materials.

In various embodiments, the method 200 further comprises positioning 204 the inner ring in a second wick. In one aspect, referring to FIG. 5, a second wick 306 is provided that defines an inner diameter. In some embodiments, the inner diameter of the second wick 306 is substantially the same as the outer diameter of the inner ring 302. Accordingly, insertion of the inner ring 302 within the second wick 306 results in a tight friction fit therebetween. In various other embodiments, the outer diameter of the inner ring 302 can be less than the inner diameter of the second wick 306 to allow the inner ring 302 to easily move within the second wick 306. In various embodiments, the inner diameter of the second wick 306 is substantially the same as the inner diameter of the first wick 304. In various other embodiments, the inner diameter of the second wick 306 is different than the inner diameter of the first wick 304.

Figure 4:
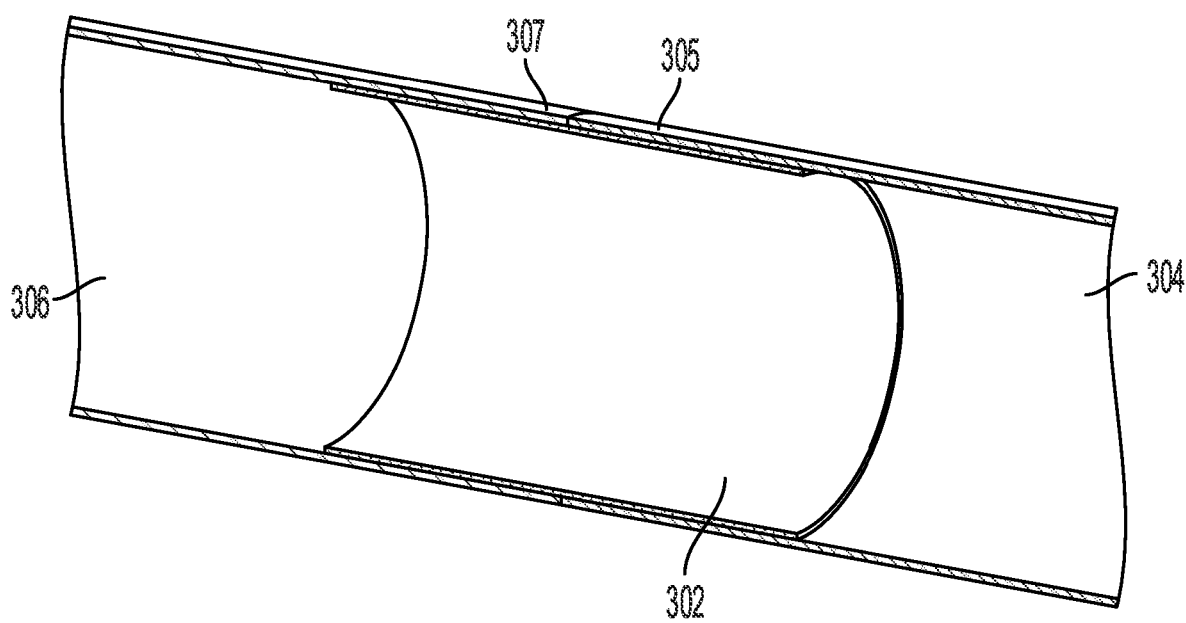
FIG. 4 illustrates the inner ring of FIG. 3 further positioned within a second wick, according to at least one aspect of the present disclosure.

In various embodiments, insertion of the inner ring 302 within the second wick 306 occurs after the inner ring 302 has been inserted within the first wick 304. In various other embodiments, insertion of the inner ring 302 within the second wick 306 occurs at substantially the same time as inserting the inner ring 302 within the first wick 304. In various embodiments, the inner ring 302 is inserted into the first wick 304 and the second wick 306 such that approximately half of the outer surface area of the inner ring 302 is covered by the first wick 304 and approximately half of the outer surface area of the inner ring 302 is covered by the second wick 306, as is shown in FIG. 4. In various other embodiments, the inner ring 302 is positioned in one of the wicks 304, 306 more than the other. In one embodiment, the inner ring 302 is positioned such that 75% of the outer surface area of the inner ring 302 is covered by the first wick 304 and the remaining 25% of the outer surface area of the inner ring 302 is covered by the second wick 306.

In various embodiments, the inner ring 302 is made from a 3D printing manufacturing process to allow for any suitable size wick to be made. In one aspect, the 3D printed inner ring comprises a 3D printed stainless steel inner ring that has a porosity similar to one or both of the first wick 304 and the second wick 306.

In various embodiments, the method 200 further includes abutting 206 an end of the first wick with an end of the second wick. In one aspect, referring to FIG. 5, the end 305 of the first wick 304 abuts the end 307 of the second wick such that the inner ring 302 is entirely covered by the first wick 304 and the second wick 306. In some embodiments, the end 305 of the first wick defines an edge that is perpendicular to the length of the first wick 304 and the end 307 of the second wick 306 defines an edge that is perpendicular to the length of the second wick 306. Accordingly, abutting the ends 305, 307 of the first wick 304 and the second wick 306 comprises abutting the perpendicular edges of the first wick 304 and the second wick 306 together, resulting in a circumferential seal about the inner ring 302. In some embodiments, the end 305 of the first wick 304 defines first fingers and the end 307 of the second wick 306 defines second fingers. Accordingly, abutting the ends 305, 307 of the first wick 304 and the second wick 306 comprises interlacing the first fingers of the first wick 304 with the second fingers of the second wick 306. In various embodiments, the abutting 206 step is omitted such that a gap is defined between the end 305 of the first wick 304 and the end 307 of the second wick 306, leaving a portion of the inner ring 302 exposed.

In various embodiments, the method 200 further includes positioning 208 an outer ring about a portion of the first wick and a portion of the second wick. In one aspect, referring to FIG. 5, an outer ring 308 is positioned about a portion of the first wick 304 and a portion of the second wick 306 such that the first wick 304, the second wick 306, and the inner ring 302 are captured by the outer ring 308. In various embodiments, the length of the inner ring 302 and the length of the outer ring 308 are identical. In various other embodiments, the length of the inner ring 302 is greater than the length of the outer ring 308. In various embodiments, the length of the outer ring 308 is greater than the length of the inner ring 302.

Figure 5:
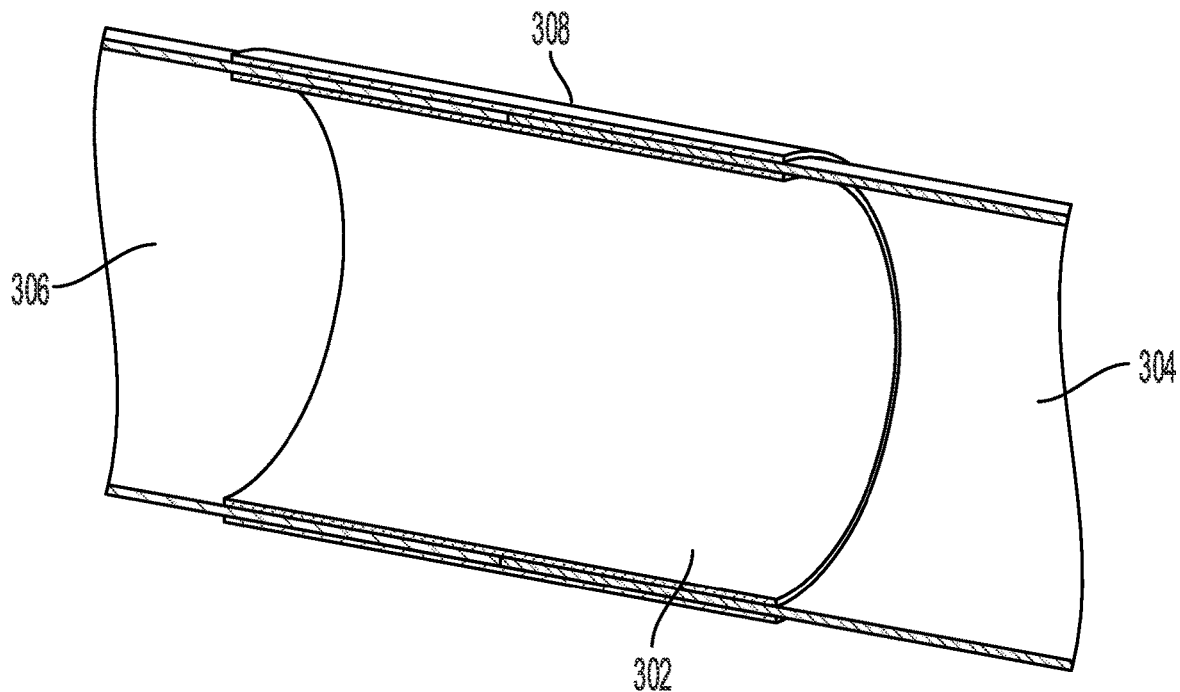
FIG. 5 illustrates an outer ring positioned about the first wick and the second wick of FIG. 4, according to at least one aspect of the present disclosure.

In one aspect, the outer ring 308 defines inner diameter, the first wick 304 defines an outer diameter, and the second wick 306 defines an outer diameter. In various embodiments, the inner diameter of the outer ring 308, the outer diameter of the first wick 304, and the outer diameter of the second wick 306 are substantially the same. Accordingly, positioning the outer ring 308 about the first wick 304 and the second wick 306 results in a tight friction fit therebetween. In various other embodiments, the inner diameter of the outer ring 308 can be greater than the outer diameter of the first wick 304 and the outer diameter of the second wick 306, allowing the outer ring 308 to easily move along the lengths of the first wick 304 and the second wick 306. In various embodiments, the outer ring 308 can be positioned about the first wick 304 and the second wick 306 such that the first portion of the first wick 304 and the second portion of the second wick 306 captured by the outer ring 308 is identical, as seen in FIG. 5. In various other embodiments, the outer ring 308 can be positioned about the first wick 304 and the second wick 306 such that the first portion of the first wick 304 and the second portion of the second wick 306 captured by the outer ring is different. In various embodiments, the inner ring 302 and the outer ring 308 cooperatively function to define the junction between the first wick 304 and the second wick 306, as explained in more detail below.

In various embodiments, the outer ring 308 is made from a 3D printing manufacturing process to allow for any suitable size wick to be made. In one aspect, the 3D printed outer ring comprises a 3D printed stainless steel outer ring that has a porosity similar to one or both of the first wick 304 and the second wick 306.

Figure 6:
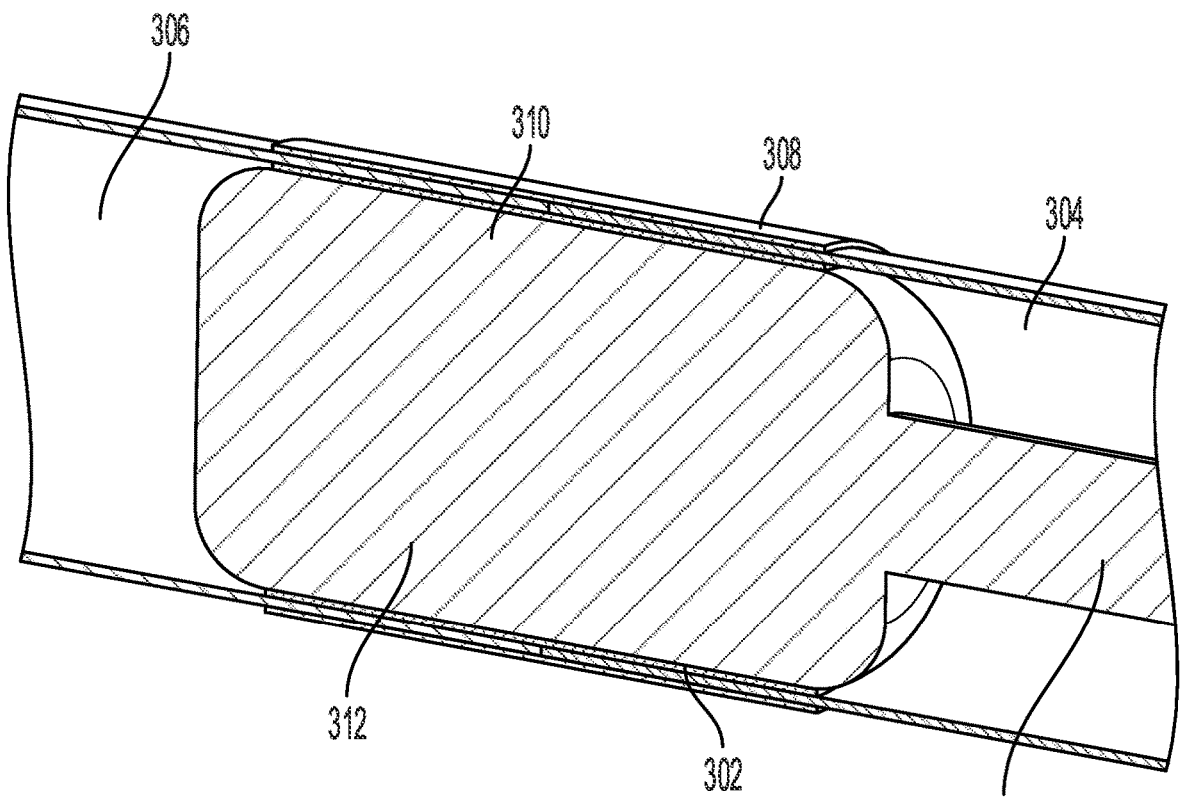
FIG. 6 illustrates a mandrel positioned within the inner ring of FIG. 5, according to at least one aspect of the present disclosure.

In various embodiments, the method 200 further includes positioning 210 a mandrel within the inner ring. Referring to FIG. 6, a mandrel 310 is provided that is positionable within the inner ring 302 by driving a head 312 of the mandrel 310 through an open end of the first wick 304 with a bar 314 extending therefrom. In various other embodiments, the mandrel 310 can be positioned within the inner ring 302 by driving the head 312 of the mandrel 310 through an open end of the second wick 306 with the bar 314. In various embodiments, the head 312 of the mandrel 310 can be comprised of a material that is sufficiently rigid to maintain its shape when the wick assembly is being defined, as explained in more detail below. In one embodiment, the mandrel 310 can be comprised of stainless steel. In various embodiments, the mandrel 310 is polished to reduce friction when inserting the head 312 of the mandrel 310 into the inner ring 302.

In various embodiments, the head 312 of the mandrel 310 defines an outer diameter that corresponds to the inside diameter of the wick assembly, as described in more detail below. Accordingly, the shape of the head 312 of the mandrel 310 defines the final shape of the inner ring 302, the first wick 304, the second wick 306, and the outer ring 308, as explained in more detail below. In various embodiments, the head 312 of the mandrel 310 defines a circular shape. In various other embodiments, the head 312 of the mandrel 310 defines an oval shape, a star shape, a square shape, a rectangular shape, or any other suitable shape for use in a heat pipe, as desired. In various embodiments, the head 312 of the mandrel 310 is adjustable such that the head 312 can be positioned within inner rings 302 of varying sizes. In one embodiment, the head 312 of the mandrel 310 comprises a tube expander that enables the head 312 of the mandrel 310 to be varied by size by a user. In some embodiments, the head 312 of the mandrel 310 comprises an expandable, or inflatable, head that can transition between an unexpanded state and an expanded state. As the head transitions toward the expanded state, the head can compress the inner ring 302 against the first wick 304 and the second wick 306.

Figure 7:
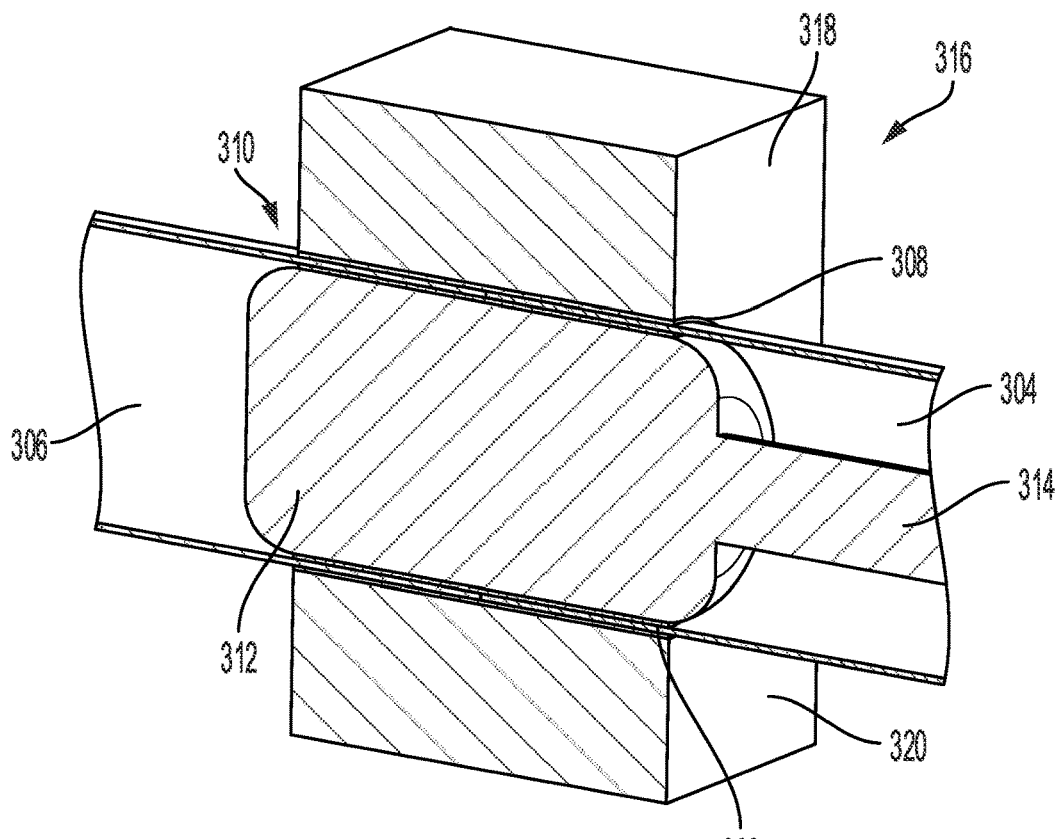
FIG. 7 illustrates a die positioned about the outer ring of FIG. 6, according to at least one aspect of the present disclosure.
Figure 8:
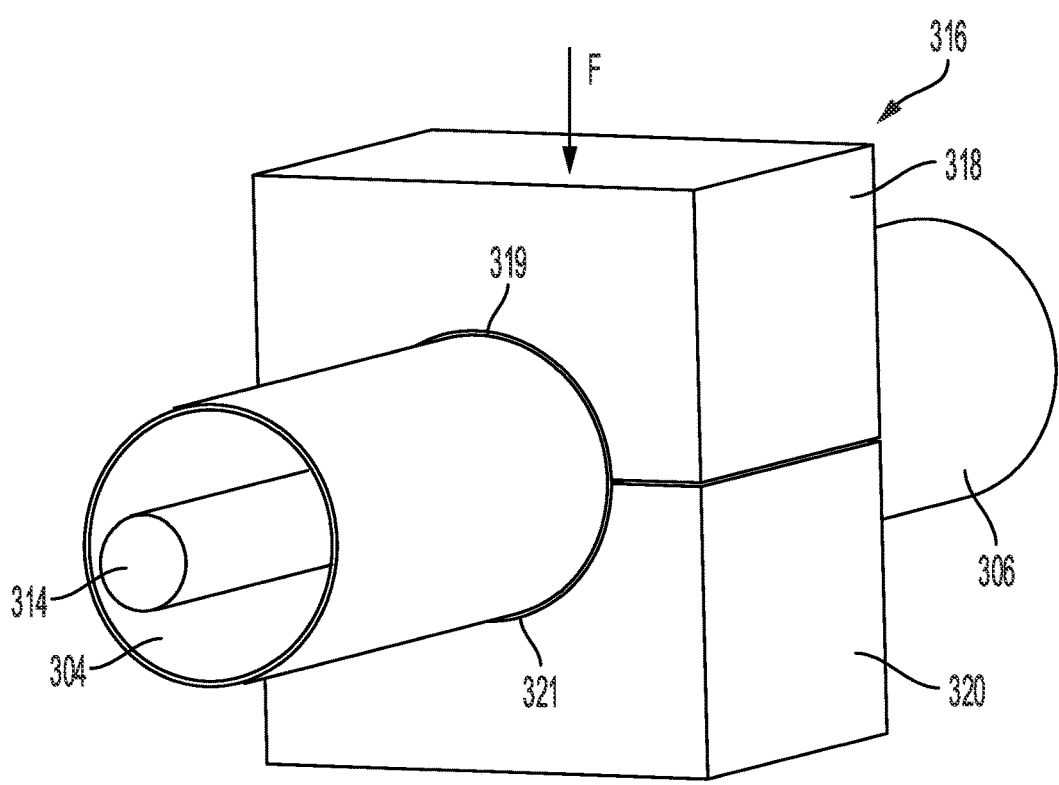
FIG. 8 illustrates a compressive force being applied to the die of FIG. 7, according to at least one aspect of the present disclosure.

In various embodiments, the method 200 further includes positioning 212 a die about the outer ring. In one aspect, referring to FIG. 7, a die 316 is provided that defines an inner diameter that is substantially the same as the outer diameter of the outer ring 308. In various other embodiments, the inner diameter of the die 316 can be greater than the outer diameter of the outer ring 308. In various embodiments, the die 316 can include a first, top clam shell 318 defining a first recess 319 and a bottom, second clam shell 320 defining a second recess 321 which cooperative function to define the inner diameter of the die 316.

In some embodiments, the first clam shell 318 is pivotably coupled to the second clam shell 320 such that the first clam shell 318 can pivot between an open configuration and a closed configuration. In the open configuration, the die 316 can receive the outer ring 308, inner ring 302, first wick 304, and second wick 306, within the first recess 319 or the second recess 321. In the closed configuration, the die 316 can maintain the outer ring 308, inner ring 302, first wick 304, and second wick 306 within the die 316. In some other embodiments, the first clam shell 318 is separate from the second clam shell 320, i.e., not fixedly attached thereto such that the first clam shell 318 is translatable independent of the second clam shell 320. In one aspect, in the closed configuration, the first recess 319 and the second recess 321 define a shape that is identical to the shape of the head 312 of the mandrel 310. Accordingly the first recess 319, the second recess 321, and the head 312 of the mandrel 310 cooperate to define the final shape of the wick assembly.

In various embodiments, the method 200 further includes applying 214 a force to the die to form the wick assembly. In one aspect, applying a force, such as a compressive force F, to the die 316 swags the outer ring 308 into the inner ring 302 and compresses the first wick 304 and the second wick 306 therebetween, crimping the outer ring 308, inner ring 302, the first wick 304, and the second wick 306 together, forming the wick assembly. The head 312 of the mandrel 310 applies a repulsive force against the compressive force F to define the final shape of the junction of the wick assembly. In one aspect, the head 312 of the mandrel 310 ensures that an even amount of compression is applied by the die 316.

In various other embodiments, the method 200 does not include positioning 212 a die about the outer ring and applying 214 a force to the force to form the wick assembly. Rather, as discussed above, the mandrel can include an expandable, or inflatable, head that can transition toward an expanded state to apply a force to the inner ring. In such embodiments, the expandable, or inflatable, head applies a sufficient force to form with wick assembly with the inner ring 302, the first wick 304, and the second wick 306. In various other embodiments, the method can collectively include the positioning 212 and force applying 214 steps, while also applying the force to the inner ring 302 with the expandable, or inflatable, head. Accordingly, the die and expandable, or inflatable, head can cooperatively apply forces to the inner ring 302, first wick 304, and second wick 304 to form the wick assembly.

After the compressive force F is applied by the die 316 to the wick assembly, the wick assembly can be removed from the die 316 and the mandrel 310 can be withdrawn out of the wick assembly. Through prototyping, the inventor discovered that the outer ring 308 has a certain amount of spring back after compression, which enables the mandrel 310 to be slide out of the wick assembly after compression. The aforementioned method 200 can then be repeated as many times as necessary to continue to add additional wicks to the wick assembly and increase the final length thereof. As referenced above, full production length wicks are 22'. According, in one embodiment, the foregoing method 200 can be performed five times using 48" wicks and then once more using a 24" wick to build a 22' wick that includes five junction points.

Once the final length of the wick assembly has been achieved using the foregoing method, the wick assembly can be diffusion bonded using any suitable diffusion bonding method to fuse the first wick 304, the second wick 306, the inner ring 302, and the outer ring 308 at each junction point together. The fused wick assembly can be then be positioned within a heat pipe.

In various embodiments, the first wick 304 and the second wick 306 have identical characteristics to one another, such as length, material, porosity, diameter, or any other suitable characteristic associated with wicks as described elsewhere herein. In various other embodiments, the first wick 304 and the second wick 306 have at least one differing characteristic from one another. Accordingly, the foregoing method 200 enables to user to create wick assemblies that have varying characteristics along the length thereof. For instance, in some embodiments, the first wick 304 includes a first porosity and the second wick 306 includes a second porosity different than the first porosity. Accordingly, a wick assembly can be creating using the first wick 304 and the second wick 306 such that the wick assembly has a varying porosity along the axis of the wick assembly, and therefore, a varying porosity along the axis of the heat pipe.

In various embodiments, the inner ring 302 and the outer ring 308 extend linearly such that adjacent wicks are joined together to form a linearly-extending wick assembly. In various other embodiments, the inner ring 302 and the outer ring 308 can extend radially such that the adjacent wicks are joined together to form a radially-extending wick assembly. Accordingly, the foregoing method 200 enables a user to produce a wick assembly that can be positioned in a curved heat pipe as opposed to a straight extending heat pipe.

Various aspects of the subject matter described herein are set out in the following examples.

Example 1—A method of forming a wick assembly, the method comprising positioning an inner ring in a first wick, positioning the inner ring in a second wick, abutting an end of the first wick with an end of the second wick, positioning an outer ring about a portion of the first wick and a portion of the second wick, positioning a mandrel within the inner ring, positioning a die about the outer ring, and applying a force to the die, wherein the force couples the outer ring, the inner ring, the first wick, and the second wick together to form the wick assembly.

Example 2—The method of Example 1, further comprising removing the mandrel from the wick assembly.

Example 3—The method of Examples 1 or 2, further comprising removing the die from the wick assembly.

Example 4—The method of Example 3, further comprising diffusion bonding the wick assembly.

Example 5—The method of any one of Examples 1-4, further comprising defining a first edge at the end of the first wick, wherein the first edge is perpendicular to the length of the first wick and defining a second edge at the end of the second wick, wherein the second edge is perpendicular to the length of the second wick, wherein abutting the end of the first wick with the end of the second wick comprises abutting the first edge at the end of the first wick with the second edge at the end of the second wick.

Example 6—The method of any one of Examples 1-4, further comprising defining first fingers at the end of the first wick and defining second fingers at the end of the second wick, wherein abutting the end of the first wick with the end of the second wick comprises interlacing the first fingers with the second fingers.

Example 7—A method of preparing a heat pipe, the method comprising forming a wick assembly, diffusion bonding the wick assembly, and positioning the diffusion bonded wick assembly in the heat pipe. Forming the wick assembly comprises positioning an inner ring in a first wick, positioning the inner ring in a second wick, positioning an outer ring about a portion of the first wick and a portion of the second wick, positioning a die about the outer ring, and applying a force to the die, wherein the force couples the outer ring, the inner ring, the first wick, and the second wick together to form the wick assembly.

Example 8—The method of Example 7, further comprising positioning a mandrel within inner ring prior to applying the force to the die.

Example 9—The method of Example 8, further comprising removing the mandrel from the wick assembly after applying the force to the die.

Example 10—The method of any one of Examples 7-9, wherein forming the wick assembly further comprises abutting an end of the first wick with an end of the second wick.

Example 11—The method of Example 10, further comprising defining a first edge at the end of the first wick, wherein the first edge is perpendicular to the length of the first wick and defining a second edge at the end of the second wick, wherein the second edge is perpendicular to the length of the second wick, wherein abutting the end of the first wick with the end of the second wick comprises abutting the first edge at the end of the first wick with the second edge at the end of the second wick.

Example 12—The method of Example 10, further comprising defining first fingers at the end of the first wick and defining second fingers at the end of the second wick, wherein abutting the end of the first wick with the end of the second wick comprises interlacing the first fingers with the second fingers.

Example 13—A method of forming a wick assembly, the method comprising positioning an inner ring in a first wick comprising a first characteristic, positioning the inner ring in a second wick comprising a second characteristic, wherein the second characteristic is different than the first characteristic, abutting an end of the first wick with an end of the second wick, positioning an outer ring about a portion of the first wick and a portion of the second wick, positioning a mandrel within the inner ring, positioning a die about the outer ring, and applying a force to the die, wherein the force couples the outer ring, the inner ring, the first wick, and the second wick together to form the wick assembly.

Example 14—The method of Example 13, wherein the first characteristic comprises a material of the first wick and the second characteristic comprises a material of the second wick.

Example 15—The method of Examples 13 or 14, wherein the first characteristic comprises a length of the first wick and the second characteristic comprises a length of the second wick.

Example 16—The method of any one of Examples 13-15, wherein the first characteristic comprises a porosity of the first wick and the second characteristic comprises a porosity of the second wick.

Example 17—The method of any one of Examples 13-16, further comprising removing the die from the wick assembly.

Example 18—The method of Example 17, further comprising diffusion bonding the wick assembly.

Example 19—The method of any one of Examples 13-18, further comprising defining a first edge at the end of the first wick, wherein the first edge is perpendicular to the length of the first wick and defining a second edge at the end of the second wick, wherein the second edge is perpendicular to the length of the second wick, wherein abutting the end of the first wick with the end of the second wick comprises abutting the first edge at the end of the first wick with the second edge at the end of the second wick.

Example 20—The method of any one of Examples 13-18, further comprising defining first fingers at the end of the first wick and defining second fingers at the end of the second wick, wherein abutting the end of the first wick with the end of the second wick comprises interlacing the first fingers with the second fingers.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The term "substantially", "about", or "approximately" as used in the present disclosure, unless otherwise specified, means an acceptable error for a particular value as determined by one of ordinary skill in the art, which depends in part on how the value is measured or determined. In certain embodiments, the term "substantially", "about", or "approximately" means within 1, 2, 3, or 4 standard deviations. In certain embodiments, the term "substantially", "about", or "approximately" means within 50%, 20%, 15%, 10%, 9%, 8%, 7%, 6%, 5%, 4%, 3%, 2%, 1%, 0.5%, or 0.05% of a given value or range.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A method of forming a wick assembly, the method comprising:
    positioning an inner ring in a first wick;
    positioning the inner ring in a second wick;
    abutting an end of the first wick with an end of the second wick;
    positioning an outer ring about a portion of the first wick and a portion of the second wick;
    positioning a mandrel within the inner ring;
    positioning a die about the outer ring; and
    applying a force to the die, wherein the force couples the outer ring, the inner ring, the first wick, and the second wick together to form the wick assembly.

2. The method of claim 1, further comprising removing the die from the wick assembly.

3. The method of claim 2, further comprising diffusion bonding the wick assembly.

4. The method of claim 1, further comprising removing the mandrel from the wick assembly.

5. The method of claim 1, further comprising:
    defining a first edge at the end of the first wick, wherein the first edge is perpendicular to the length of the first wick; and
    defining a second edge at the end of the second wick, wherein the second edge is perpendicular to the length of the second wick;
    wherein abutting the end of the first wick with the end of the second wick comprises abutting the first edge at the end of the first wick with the second edge at the end of the second wick.

6. The method of claim 1, further comprising:
    defining first fingers at the end of the first wick; and
    defining second fingers at the end of the second wick;
    wherein abutting the end of the first wick with the end of the second wick comprises interlacing the first fingers with the second fingers.

7. A method of preparing a heat pipe, the method comprising:
    forming a wick assembly, comprising:
        positioning an inner ring in a first wick;
        positioning the inner ring in a second wick;
        positioning an outer ring about a portion of the first wick and a portion of the second wick;
        positioning a die about the outer ring; and
        applying a force to the die, wherein the force couples the outer ring, the inner ring, the first wick, and the second wick together to form the wick assembly,
    diffusion bonding the wick assembly; and
    positioning the diffusion bonded wick assembly in the heat pipe.

8. The method of claim 7, further comprising positioning a mandrel within inner ring prior to applying the force to the die.

9. The method of claim 8, further comprising removing the mandrel from the wick assembly after applying the force to the die.

10. The method of claim 7, wherein forming the wick assembly further comprises abutting an end of the first wick with an end of the second wick.

11. The method of claim 10, further comprising:
    defining a first edge at the end of the first wick, wherein the first edge is perpendicular to the length of the first wick; and
    defining a second edge at the end of the second wick, wherein the second edge is perpendicular to the length of the second wick;
    wherein abutting the end of the first wick with the end of the second wick comprises abutting the first edge at the end of the first wick with the second edge at the end of the second wick.

12. The method of claim 10, further comprising:
    defining first fingers at the end of the first wick; and
    defining second fingers at the end of the second wick;
    wherein abutting the end of the first wick with the end of the second wick comprises interlacing the first fingers with the second fingers.

13. A method of forming a wick assembly, the method comprising:
    positioning an inner ring in a first wick comprising a first characteristic;
    positioning the inner ring in a second wick comprising a second characteristic, wherein the second characteristic is different than the first characteristic;
    abutting an end of the first wick with an end of the second wick;
    positioning an outer ring about a portion of the first wick and a portion of the second wick;

positioning a mandrel within the inner ring;

positioning a die about the outer ring; and applying a force to the die, wherein the force couples the outer ring, the inner ring, the first wick, and the second wick together to form the wick assembly.

14. The method of claim 13, further comprising removing the die from the wick assembly.

15. The method of claim 14, further comprising diffusion bonding the wick assembly.

16. The method of claim 13, wherein the first characteristic comprises a material of the first wick and the second characteristic comprises a material of the second wick.

17. The method of claim 13, wherein the first characteristic comprises a length of the first wick and the second characteristic comprises a length of the second wick.

18. The method of claim 13, wherein the first characteristic comprises a porosity of the first wick and the second characteristic comprises a porosity of the second wick.

19. The method of claim 13, further comprising:

defining a first edge at the end of the first wick, wherein the first edge is perpendicular to the length of the first wick; and defining a second edge at the end of the second wick, wherein the second edge is perpendicular to the length of the second wick;

wherein abutting the end of the first wick with the end of the second wick comprises abutting the first edge at the end of the first wick with the second edge at the end of the second wick.

20. The method of claim 13, further comprising:

defining first fingers at the end of the first wick; and defining second fingers at the end of the second wick;

wherein abutting the end of the first wick with the end of the second wick comprises interlacing the first fingers with the second fingers.

\* \* \* \* \*